UNITED STATES PATENT OFFICE.

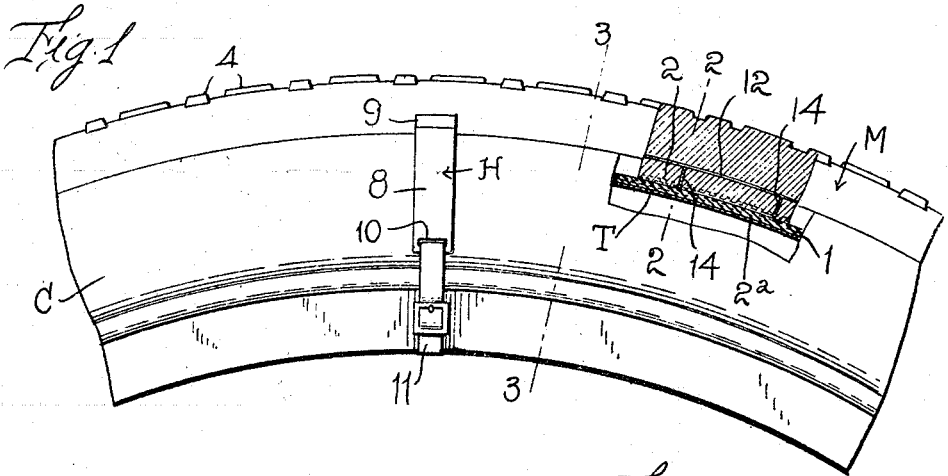
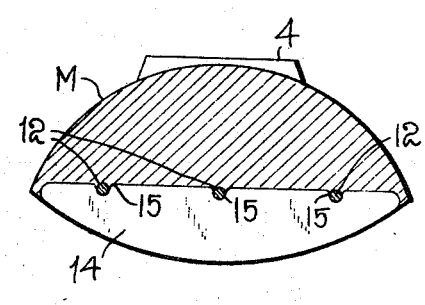
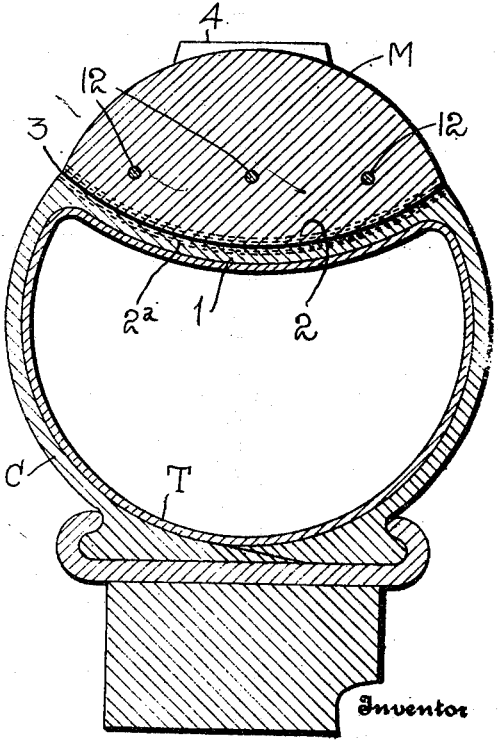
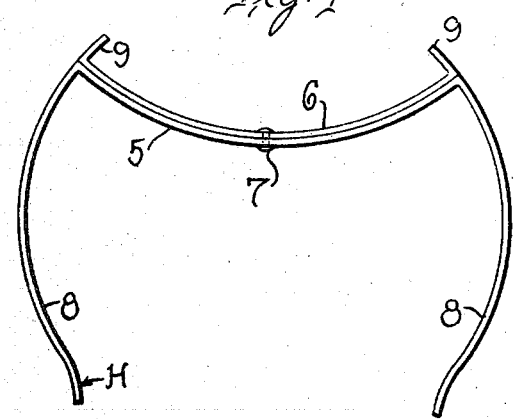

STANLEY I. SMITH, OF DUDLEY TOWNSHIP, HARDIN COUNTY, OHIO.

TIRE.

1,255,654.

Specification of Letters Patent.  Patented Feb. 5, 1918.

Application filed May 7, 1917. Serial No. 167,074.

*To all whom it may concern:*

Be it known that I, STANLEY I. SMITH, a citizen of the United States, residing at Dudley township, in the county of Hardin and State of Ohio, have invented certain new and useful Improvements in Tires, of which the following is a specification, reference being had to the accompanying drawings.

This invention relates to certain improvements in tires and it is an object of the invention to provide a novel and improved device of this general character wherein a removable tread is employed and whereby the tire is rendered substantially punctureproof and free from blow-outs.

The invention consists in the details of construction and in the combination and arrangement of the several parts of my improved tire whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a fragmentary view partly in elevation and partly in section illustrating a tire constructed in accordance with an embodiment of my invention;

Fig. 2 is an enlarged transverse sectional view taken substantially on the line 2—2 of Fig. 1;

Fig. 3 is an enlarged sectional view taken substantially on the line 3—3 of Fig. 1; and Fig. 4 is an enlarged view in elevation of one of the holding members as herein embodied.

As disclosed in the accompanying drawings, C denotes a casing or carcass or any ordinary or preferred construction and which is adapted to be inflated. In the accompanying drawings I show within the casing or carcass an inner tube T, although it is to be understood that if desired the carcass or casing C may be so constructed as to dispense with such inner tube.

The tread portion of the casing or carcass C is provided with the circumferentially disposed inbow 1 forming a continuous annular channel and in which is adapted to be seated the annular tread member M. The member M may be formed as desired but preferably of rubber or a composition of rubber having vulcanized to the inner face thereof a lamination 2 of canvas or other fabric. The cross sectional configuration of the tread member M is such as to have the inner face thereof conform to the cross sectional configuration of the inbow 1 so that the inner portion of the tread member M will snugly seat within the channel afforded by said inbow 1. It is also preferred that the bottom portion of the inner face of the tread member M be held within the channel through the medium of a suitable adhesive, as indicated at 3.

The periphery of the tread member M is provided with suitable calks 4 or the like to prevent skidding and said member M is also of such thickness as to maintain the casing or carcass C a pronounced distance away from the surface over which the tire may travel so that the possibility of puncturing the tire is substantially entirely eliminated.

In order to apply the member M it will be understood that the casing or carcass C will be deflated and it will also be self-evident that the tread member M may be removed when unduly worn or otherwise unfit for use and be conveniently replaced by a new member.

I also find it of advantage to provide means other than suitable adhesive for maintaining the member M seated within the channel afforded by the inbow 1. As herein disclosed, I provide a plurality of holding members H which are preferably four in number and equidistantly spaced circumferentially of the tire.

Each of the members H comprises two superimposed metallic strips 5 and 6 curved longitudinally to conform to the cross sectional configuration of the inbow 1 and said members are secured one to the other at substantially their longitudinal centers through the medium of a rivet 7 or the like.

The extremities of one of the strips 5 are angularly disposed, as at 8, to overlie the side walls of the casing or carcass C, while the opposite end portions of the second member 6 are angularly disposed, as at 9, in an opposite direction to overlie the side portions of the member M.

If desired the free end portions of the angular extensions 8 may be provided with slots 10 whereby straps 11 or the like may be engaged with said extensions. The straps 11 are adapted to be disposed around the rim of the wheel to further assure the proper maintenance of the member M upon the casing or carcass C. It has also been found of advantage to use adhesive 3 to exclude dirt and moisture from between the member M and the casing or carcass C which would otherwise tend to have an injurious effect thereon.

It has also been found of importance to embed within the tread member M the transversely spaced reinforcing members 12 disposed circumferentially thereof and which members are of metal or other material. In order to maintain the members 12 in the desired spaced relation and to prevent said members from cutting through the tread M, I employ a number of transversely disposed plates 14, arranged in predetermined circumferentially spaced relation. The inner edge of each of said plates 14 is substantially straight and provided with the notches or recesses 15, in which the members 12 are seated. The outer edge of the plate 14 conforms to the cross sectional configuration of the inbow or channel 1. It will also be self-evident that the members 12 serve to materially reinforce the tread member M. In practice I find it best that each of the plate members 14 be of a length less than the width of the inbow or channel 1.

I also find it of advantage to vulcanize to the outer face of the inbow or channel 1 a lamination 2ª of woven fabric which serves as a bond to maintain the inbow or channel 1 in proper cross sectional configuration, especially when the carcass C is inflated.

From the foregoing description it is thought to be obvious that a tire constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A tire structure consisting of a casing provided with a circumferentially disposed annular inbow in its tread portion, a tread member seated within said inbow, and holding means interposed between the tread member and the casing, each of said holding means including imposed strips secured one to the other at substantially their longitudinal centers and provided with angular terminals overlying the side faces of the tread member and the casing.

2. A tire construction including a casing provided in its tread portion with a circumferentially disposed annular inbow, a tread member seated within said inbow, and members embedded within the inner face of the tread member and disposed transversely thereof, the outer edges of said members conforming to the cross sectional configuration of the inbow.

3. A tire construction including a casing provided in its tread portion with a circumferentially disposed annular inbow, a tread member seated within said inbow, members embedded within the inner face of the tread member and disposed transversely thereof, the outer edges of said members conforming to the cross sectional configuration of the inbow, and circumferentially disposed members embedded in the tread member, said transversely disposed members being provided with notches in which said circumferentially disposed members are seated.

4. A tire structure consisting of a casing provided with a circumferentially disposed annular inbow in its tread portion, a tread member seated within said inbow, holding means interposed between the tread member and the casing, each of said holding means including imposed plates secured one to the other and provided with angular terminals overlying the side faces of the tread member and the casing, and securing members operatively engaged with the angular terminals and overlying the side faces of the casing.

In testimony whereof I hereunto affix my signature in the presence of two witnesses.

STANLEY I. SMITH.

Witnesses:
LEONARD COX,
STANLEY KINNEY.